United States Patent
Bujard et al.

(10) Patent No.: US 7,658,488 B2
(45) Date of Patent: *Feb. 9, 2010

(54) PROCESS FOR PRINTING AN AQUEOUS INK COMPOSITION

(75) Inventors: Patrice Bujard, Reinach (CH); Gerald Anthony Murphy, Muttenz (CH); Véronique Hall-Goulle, Dornach (CH); Ulrich Strahm, Aesch (CH); Marco Meneghini, Muttenz (CH); Alex Känzig, Therwil (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 11/732,406

(22) Filed: Apr. 3, 2007

(65) Prior Publication Data

US 2007/0184192 A1    Aug. 9, 2007

Related U.S. Application Data

(62) Division of application No. 10/480,769, filed as application No. PCT/EP02/06308 on Jun. 10, 2002, now Pat. No. 7,261,404.

(30) Foreign Application Priority Data

Jun. 14, 2001  (CH) ................... 1079/01

(51) Int. Cl.
   *G01D 11/00*   (2006.01)
(52) U.S. Cl. .............. 347/100; 347/95; 523/160; 106/31.27
(58) Field of Classification Search ............. 347/100, 347/95, 96, 101; 523/160; 106/31.6, 31.27, 106/31.13
See application file for complete search history.

(56) References Cited

U.S. PATENT DOCUMENTS

| | | | |
|---|---|---|---|
| 2,580,205 A | 12/1951 | Voet | 106/23 |
| 4,020,063 A | 4/1977 | Mayer et al. | 540/541 |
| 4,119,478 A | 10/1978 | Robertson | 106/493 |
| 4,262,936 A | 4/1981 | Miyamoto | 106/31.17 |
| 4,576,649 A | 3/1986 | Oliver et al. | 106/308 |
| 4,657,590 A * | 4/1987 | Gamblin | 524/43 |
| 5,744,519 A | 4/1998 | Heraud et al. | 523/160 |
| 6,110,266 A | 8/2000 | Gonzalez-Blanco et al. | 106/31.65 |
| 6,540,344 B2 | 4/2003 | Kashiwazaki et al. | 347/100 |
| 6,770,331 B1 | 8/2004 | Mielke et al. | 347/100 |

FOREIGN PATENT DOCUMENTS

| | | |
|---|---|---|
| EP | 0921166 | 6/1999 |
| JP | 56-155260 | 12/1981 |
| JP | 57-25376 | 2/1982 |
| JP | 9-111162 | 4/1997 |
| JP | 2001-49158 | 2/2001 |
| JP | 2001-049158 | * 2/2001 |
| WO | 97/09387 | 3/1997 |

OTHER PUBLICATIONS

Patent Abstracts of Japan of 57-25376.
Patent Abstracts of Japan of 56-155260.
Patent Abstracts of Japan of 2001-49158.
Patent Abstracts of Japan of 9-111162.

* cited by examiner

*Primary Examiner*—Manish S Shah
(74) *Attorney, Agent, or Firm*—Shiela A. Loggins

(57) ABSTRACT

A process for printing flat substrates, in which the said substrate is printed with an ink composition including (a) a basic dye together with (b) an aliphatic carboxylic acid having at least four carbon atoms, (d) a binder resin, and water, yields water-resistant prints having a high depth of shade and high chroma.

21 Claims, No Drawings

PROCESS FOR PRINTING AN AQUEOUS INK COMPOSITION

This is a divisional of U.S. application Ser. No. 10/480,769 filed Dec. 11, 2003 now U.S. Pat. No. 7,261,404, filed as application Ser. No. PCT/EP02/06308 on Jun. 10, 2002.

The present invention relates to a process for printing flat substrates, for example paper, in which an aqueous ink composition is used that comprises higher aliphatic carboxylic acid salts of basic dyes as colourant.

Both pigments and dyes have been used hitherto as colourants in printing inks. Dye-based inks have certain disadvantages, however, compared with pigment inks. For example, dyes are water-soluble and retain that property even when dry on the substrate. For that reason, if the dyes on the substrate come into contact with water they dissolve again and smudge or bleed. The result of the lack of water-resistance of dyes is that printed products produced using them become illegible and/or unsightly on contact with water or moisture. Although pigments are water-insoluble, and the printed products produced using pigment inks accordingly have a good resistance to water, pigments are distinctly inferior to dyes in tinctorial strength and chroma. Compared with dyes, pigments also have a higher degree of fastness to light, with the result that printed products produced using pigment inks fade substantially more slowly. In practice, therefore, it would be desirable to have available ink compositions in which the colourants have both the advantages of dyes and the advantages of pigments.

In addition, the use of environmentally friendly and up-to-date printing ink compositions that are water-based should be possible without there being any detrimental effect on the application-related properties. Water-based inks are to be understood as compositions in which the water component is from 5 to 100% by weight, based on the total weight of all volatile components in the ink. The preferred lower limit is 20% by weight, especially 50% by weight, of water.

EP-A-0 921 166 discloses, for use in ink-jet printing methods, aqueous printing inks that comprise polymer/dye complexes and are distinguished by a good resistance to water, an improved stability to light and good chroma.

The problem underlying the present invention is accordingly to provide a new printing process in which water-based inks having good application-related properties are used. The method according to the invention should especially produce prints that are distinguished by a good resistance to water and a high tinctorial strength and high chroma.

The present invention thus relates to a process for printing flat substrates in which the said substrate is printed using an ink composition comprising a) a basic dye together with b) an aliphatic carboxylic acid having at least four carbon atoms, and water.

Basic dyes a) in the dyeing sense are those that behave cationically during dyeing and that react with anionic groups of the substrate to be coloured, for example a woven textile fabric, with the formation of salts. Such dyes are, for example, xanthene, azine, oxazine, thiazine, methine and di- and tri-arylmethane dyes. Basic dyes include on the one hand those in which the molecule forms a cation, for example the triphenylmethanes and the azines, and on the other hand also those containing, for example, amino or alkylamino groups. The basic dyes are generally in the form of soluble salts, for example chlorides, oxalates, zinc chloride double salts, carbonates or sulfates. The expression "basic dyes" is also used to indicate a structural characteristic, and in that narrower sense simply denotes dyes in which the molecule is a cation.

Suitable basic dyes are described, for example, in the Colour Index, 3. Ed., Vol. 1, The Society of Dyers and Colourists (1971), 1607-1688 and also in the more recent editions of the Colour Index or in *The Chemistry of Synthetic Dyes*, Vol. II, K. Venkataraman, Academic Press Inc., Publishers, New York (1952), 705-795.

Preferably, the amount of basic dye a) present in the ink composition is from 0.01 to 25% by weight, especially from 0.1 to 10% by weight, and more especially from 0.1 to 5% by weight, based on the total weight of the printing ink.

Aliphatic carboxylic acids having at least four carbon atoms b) suitable for the ink used in accordance with the invention include, for example saturated or mono- or poly-unsaturated fatty acids, which are unbranched linear, or branched, for example n-butyric acid ($C_4$), n-valeric acid ($C_5$), branched isovaleric acid ($C_5$), n-caproic acid ($C_6$), caprylic acid ($C_8$), pelargonic acid ($C_9$), capric acid ($C_{10}$), lauric acid ($C_{12}$), myristic acid ($C_{14}$), palmitic acid ($C_{16}$), stearic acid ($C_{18}$), mono-unsaturated oleic acid ($C_{18}$), di-unsaturated linoleic acid ($C_{18}$), tri-unsaturated linolenic acid ($C_{18}$), erucic acid ($C_{22}$) and cerotic acid ($C_{26}$);

carboxylic acids based on terpenes, for example acyclic, monocyclic or bicyclic $C_{10}$terpenes, acyclic, monocyclic, bicyclic or tricyclic $C_{15}$sesquiterpenes, acyclic, monocyclic or tricyclic $C_{20}$diterpenes, especially tricyclic $C_{20}$diterpenes, e.g. abietic acid, dihydroabietic acid and tetrahydroabietic acid;

carboxylic acids having a steroid skeleton, such as the bile acids, for example cholanic acid, or the corresponding derivatives, substituted by hydroxy on the steroid skeleton, cholic acid, deoxycholic acid, chenodeoxycholic acid and lithocholic acid; and carboxylic acids having an unsubstituted or $C_1$-$C_4$alkyl-substituted $C_5$-$C_7$cycloalkyl skeleton, for example 4-cyclohexylbutyric acid, 3-cyclohexylpropionic acid, cyclohexylacetic acid, cyclohexanecarboxylic acid, 4-methylcyclohexanecarboxylic acid and cyclopentanecarboxylic acid.

The aliphatic carboxylic acid having at least four carbon atoms b) present in the ink composition used in accordance with the invention is preferably a $C_4$-$C_{24}$carboxylic acid, especially a $C_8$-$C_{24}$carboxylic acid and more especially a $C_{12}$-$C_{24}$carboxylic acid. The mentioned carboxylic acids are unsubstituted or, furthermore, substituted, for example by hydroxy or chlorine, preferably hydroxy. Preferably, the mentioned carboxylic acids are unsubstituted.

The aliphatic carboxylic acid used as component b) contains one or more, for example two, carboxyl groups, for example azelaic acid ($C_9$) or camphoric acid ($C_{10}$), preferably one carboxyl group, for example the aliphatic carboxylic acids mentioned above by way of example.

The aliphatic carboxylic acid b) present in the ink composition used in accordance with the invention is more preferably a saturated or mono- or poly-unsaturated $C_{12}$-$C_{24}$fatty acid, especially a saturated or mono-unsaturated $C_{12}$-$C_{18}$fatty acid.

Preferably, the amount of the aliphatic carboxylic acid b) present in the ink composition is from 0.01 to 25% by weight, especially from 0.1 to 10% by weight and more especially from 0.1 to 5% by weight, based on the total weight of the printing ink.

The exact amount of aliphatic carboxylic acid used as component b) is governed by the prevailing conditions and is, for example, from 0.01 to 1 molar equivalent based on the basic dye a). It is advantageously so selected that an appreciable proportion of the basic dye in the ink composition is present in the form of a water-insoluble carboxylic acid salt. It is also possible to use an excess of carboxylic acid b), that is to say more than one molar equivalent based on the basic dye a). In that case the excess carboxylic acid not bound in salt form acts as solvent or dispersant for the colourants present in the ink. The excess carboxylic acid not bound in salt form may be identical to or different from the carboxylic acid bound in salt form.

The procedure for the preparation of the printing inks advantageously comprises first of all preparing the carboxylic acid salt of the basic dye separately and then dispersing it in the aqueous ink formulation, which may already contain all the remaining components. The carboxylic acid salt is prepared, for example, by dissolving the dye in water, adding the required amount of carboxylic acid and isolating the water-insoluble salt formed or, preferably, by dissolving the dye in the liquid carboxylic acid.

Preferably, the aqueous ink composition used in accordance with the invention comprises a pigment as a further component c), in addition to the components a) and b) indicated above.

Pigments c) suitable for the ink used in accordance with the invention include, for example, inorganic pigments, e.g. carbon black, titanium dioxide or iron oxides; and organic pigments, e.g. those of the phthalocyanine, anthraquinone, perinone, indigoid, thioindigoid, dioxazine, diketopyrrolopyrrole, isoindolinone, perylene, azo, quinacridone and metal complex series, such as metal complexes of azo, azomethine or methine dyes, as well as conventional azo dyes of the β-oxynaphthoic acid and acetoacetarylide series, and metal salts of azo dyes. Mixtures of various pigments or mixtures of an inorganic pigment with an organic pigment can also be used.

Suitable organic pigments c) are described, for example, in *Industrial Organic Pigments*, W. Herbst, K. Hunger, $2^{nd}$ Ed., VCH Verlagsgesellschaft, Weinheim, 1997, 187 ff.

In principle, any desired pigment can be employed as component c) in the ink composition used in accordance with the invention. Preferably, the choice of pigment is governed by the shade of colour that is to be established.

Preferably, the amount of pigment c) present in the ink composition is from 0.1 to 35% by weight, especially from 0.1 to 20% by weight, and more especially from 1 to 10% by weight, based on the total weight of the printing ink.

Advantageous colourant combinations of the basic dye a) and the pigment c) include, e.g., C.I. Basic Blue 145 with C.I. Pigment Black 7 (from 0.1 to 3% by weight of Maxilon® Blue TRL with from 30 to 35% by weight of Unisperse® Black B-PI); C.I. Basic Blue 3 with C.I. Pigment Blue 15:3 (from 1 to 10% by weight of Maxilon® Blue 5G with from 20 to 30% by weight of Unisperse® Blue G-PI); C.I. Basic Violet 16 with C.I. Pigment Red 57 (from 1 to 10% by weight of Maxilon® Red 2B with from 20 to 30% by weight of Unisperse® Rubine 4BA-PA); C.I. Basic Red 46 with C.I. Pigment Red 57 (from 1 to 10% by weight of Maxilon® Red GRL with from 20 to 30% by weight of Unisperse® Rubine 4BA-PA); C.I. Basic Red 51 with C.I. Pigment Red 57 (from 1 to 10% by weight of Maxilon® Red SL with from 20 to 30% by weight of Unisperse® Rubine 4BA-PA); C.I. Basic Red 12 with C.I. Pigment Red 57 (from 1 to 10% by weight of Astraphloxin with from 20 to 30% by weight of Unisperse® Rubine 4BA-PA); C.I. Basic Yellow 13 with C.I. Pigment Yellow 13 (from 1 to 10% by weight of Maxilon® Yellow 5GL with from 20 to 30% by weight of Unisperse® Yellow BAW-PI); C.I. Basic Yellow 29 with C.I. Pigment Yellow 13 (from 1 to 10% by weight of Maxilon® Yellow GRL with from 20 to 30% by weight of Unisperse® Yellow BAW-PI); C.I. Basic Yellow 92 with C.I. Pigment Yellow 13 (from 1 to 10% by weight of Maxilon® Yellow GRL with from 20 to 30% by weight of Unisperse® Yellow BAW-PI). Maxilon® and Unisperse® are registered trade marks of Ciba Spezialitätenchemie.

Preferably, the ink composition used in accordance with the invention also contains a polymeric binder resin as a component d) which, inter alia, acts as a dispersant for the colourants used in the printing ink and as a film-forming agent. The polymeric binder resin d) is, for example, an anionic polymer, especially a carboxylic acid group-containing polymer, obtained by polymerisation or copolymerisation of suitable vinyl monomers, for example those from the group acrylic acid, methacrylic acid, itaconic acid, crotonic acid, isocrotonic acid, 2-hydroxyethyl methacrylate, 2-hydroxyethyl acrylate, methyl acrylate, methyl meth-acrylate, ethyl acrylate, ethyl methacrylate, butyl acrylate, butyl methacrylate, acrylonitrile, methacrylonitrile, acrylamide, methacrylamide, N,N-dimethylacrylamide, N,N-dimethyl-methacrylamide, styrene, butadiene, vinyl acetate, N-vinylpyrrolidone, N-vinyl-N-methyl-formamide, N-vinyl-N-methyl-acetamide, N-vinyl-N-ethyl-acetamide, vinyl propionate, maleic anhydride and maleic acid.

The polymeric binder resin d) can be prepared from the monomers by any suitable polymerisation method, for example by free-radical polymerisation in solution or by emulsion polymerisation.

The following copolymers may be mentioned by way of example as suitable binder resins d): styrene/acrylic acid copolymer, styrene/methacrylic acid copolymer, styrene/acrylic acid/methacrylate copolymer, styrene/methacrylic acid/methacrylate copolymer, styrene/maleic acid copolymer, styrene/maleic acid/methacrylate copolymer. Such resins are also available commercially in acidic form or in partially or completely neutralised form, and are obtainable, for example, under the trade names Carboset® (BF Goodrich), Acrysol® (Rohm & Haas), Acryloid® (Rohm & Haas), Joncryl® (Johnson), Elvacit® (E.I. du Pont de Nemours) and Vinacryl® (Vinamul Ltd.). Suitable binders are dispersible in aqueous medium or, where appropriate with the addition of bases, are soluble in aqueous medium.

Preferably, the amount of binder resin d) present in the ink composition is from 0.1 to 40% by weight, especially from 0.1 to 25% by weight, and more especially from 1 to 10% by weight, based on the total weight of the printing ink.

The exact amount of the binder resin used as component d) is governed by the prevailing conditions and is, for example, 1.5 times the total amount by weight, or more, of colourant present in the ink.

The pigments c) are advantageously used in the printing inks already in dispersed form.

In that case the pigments are advantageously so ground with the dispersant that an average particle size of 1 µm or smaller, especially an average particle size of from 0.05 to 0.5 µm, is obtained. A defined particle spectrum can be obtained, for example, if the pigments are wet-ground and the particle spectrum is continuously monitored by laser particle-size analysis.

The usual dispersants, such as, for example, the binder resin d) described above, can be used to produce the pigment dispersions.

Advantageously, the aqueous printing ink may, in addition, comprise a base for adjusting the pH value, for example an organic amine or an alkali metal hydroxide, such as sodium hydroxide, potassium hydroxide or lithium hydroxide. Preference is given to an organic amine, e.g. ammonia, aminomethylpropanol, dimethylaminomethylpropanol, dimethyl ethanolamine, diethanolamine, triethanolamine, morpholine, piperazine or piperidine or mixtures thereof, so that as the printing ink dries the base volatilizes and the film resulting therefrom becomes water-insoluble. The concentration of the base is so calculated that the free carboxyl groups of the binder resin and of the aliphatic carboxylic acid b), which is used in the printing ink optionally in excess to the basic dye a), are present in the form of an amine salt. Advantageously, the printing ink is neutral to weakly alkaline and has a pH of, for example, from 7.5 to 10.

The printing inks used in accordance with the invention may comprise a solubiliser or a humectant, such as a water-miscible organic solvent, for example a $C_1$-$C_4$alcohol, such as methanol, ethanol, n-propanol, isopropanol, n-butanol, sec-butanol, tert-butanol or isobutanol; an amide, e.g. dimethylformamide or dimethyl acetamide; a ketone or ketone alcohol, e.g. acetone, methyl isobutyl ketone, diacetone alcohol; an ether, e.g. tetrahydro-furan or dioxan; a nitrogen-containing heterocyclic compound, e.g. N-methyl-2-pyrrolidone or 1,3-dimethyl-2-imidazolidone; a polyalkylene glycol, preferably a low molecular weight poly-ethylene glycol having a molecular weight of from 100 to 800, e.g. diethylene glycol, triethylene glycol, tetraethylene glycol, polyethylene glycol 200, polyethylene glycol 300, polyethylene glycol 400 or polyethylene glycol 600, especially having a molecular weight of from 150 to 400, or a low molecular weight polypropylene glycol, e.g. dipropylene glycol, tripropylene glycol, polypropylene glycol P 400 or polypropylene glycol P 425; a $C_1$-$C_4$alkyl ether of a polyalkylene glycol, e.g. diethylene glycol monobutyl ether, 2-(2-methoxyethoxy)-ethanol, 2-(2-ethoxyethoxy)ethanol, 2-[2-(2-methoxyethoxy)ethoxy]ethanol or 2-[2-(2-ethoxyethoxy)ethoxy]ethanol; a $C_2$-$C_6$alkylene glycol or a thioglycol, e.g. ethylene glycol, propylene glycol, butylene glycol, 1,5-pentanediol, thiodiglycol, hexylene glycol; further a polyol, e.g. glycerol or 1,2,6-hexanetriol; or a $C_1$-$C_4$alkyl ether of a polyhydric alcohol, e.g. 2-methoxyethanol or 1-methoxypropan-2-ol;

in an amount of, for example, from 0 to 30% by weight, preferably from 2 to 25% by weight, based on the total weight of the printing ink.

The printing inks used in accordance with the invention may comprise thickeners of natural or synthetic origin, inter alia for adjusting the viscosity.

Examples of thickeners that may be mentioned include commercially available alginate thickeners, starch ethers and carob bean flour ethers, especially sodium alginate on its own or in admixture with modified cellulose, especially with preferably from 20 to 25 percent by weight of carboxymethyl cellulose. There may furthermore be mentioned as synthetic thickeners, for example, those based on poly(meth)acrylic acids or poly(meth)acrylamides.

The inks may contain such thickeners in an amount of, for example, from 0 to 20% by weight, preferably from 0.1 to 10% by weight, based on the total weight of the ink.

Further additives that may be present in the printing inks used in accordance with the invention include surfactants and wetting agents in an amount of, for example, from 0 to 1% by weight, based on the total weight of the ink.

Suitable surfactants and wetting agents include commercially available anionic or non-ionic surfactants.

Furthermore, the printing inks may in addition comprise customary additives, e.g. anti-foaming agents or especially substances that inhibit fungal and/or bacterial growth. Such additives are usually used in amounts of from 0 to 2% by weight, preferably from 0.01 to 1% by weight, based on the total weight of the ink.

Suitable preservatives include formaldehyde-yielding agents, e.g. paraformaldehyde and trioxane, especially aqueous formaldehyde solutions, for example 30 to 40 percent by weight formaldehyde solutions, imidazole compounds, e.g. 2-(4-thiazolyl)benzimidazole, thiazole compounds, e.g. 1,2-benzisothiazolin-3-one or 2-n-octyl-isothiazolin-3-one, iodine compounds, nitrites, phenols, haloalkylthio compounds or pyridine derivatives, especially 1,2-benzisothiazolin-3-one or 2-n-octyl-isothiazolin-3-one.

The printing inks can be prepared in customary manner by mixing together the individual components, for example in the desired amount of water. Suspended matter and insoluble components present in the inks are removed, for example, by filtration through filters having a pore size of from 0.5 to 5 µm.

The process according to the invention is suitable for printing a wide variety of materials, e.g. paper and coated types of paper, such as wallpaper, decorative papers and especially packaging materials made of paper, metals and plastics, such as aluminium, soft and hard PVC, polyamide films and polystyrene films, cellulose acetate films, polyethylene, poly-propylene and polyester films, glass, ceramics, regenerated cellulose film, coated types of regenerated cellulose film, and woven textile fabric of, for example, cellulose, silk, wool or synthetic polyamides, polyesters or polyacrylonitrile.

Advantageous in accordance with the invention is the printing of paper.

Preference is given to a process according to the invention in which paper is printed with an ink composition comprising a) a basic dye, b) a $C_{12}$-$C_{24}$carboxylic acid, c) a pigment, d) a binder resin, and water.

Special preference is given to a process according to the invention in which paper is printed with an ink composition containing a) from 0.1 to 10% by weight, especially from 0.1 to 5% by weight, of a basic dye together with b) from 0.1 to 10% by weight, especially from 0.1 to 5% by weight, of a $C_{12}$-$C_{24}$carboxylic acid, c) from 0.1 to 20% by weight, especially from 1 to 10% by weight, of a pigment and d) from 0.1 to 25% by weight, especially from 1 to 10% by weight, of a binder resin, each based on the total weight of the printing ink, and water.

The process according to the invention is applied using printing methods customary in reproduction and duplication technology, for example the letterpress printing method, such as flexographic printing, woodcuts or lino cuts, the planographic printing method, such as offset printing, tin printing, lithographic printing and phototype printing, the intaglio printing method, such as copper engraving, etching, steel engraving, the porous printing method, which is also referred to as screen printing, or the ink-jet printing method, which has gained importance more recently, especially in the office sector.

The prints produced in accordance with the invention exhibit good fastness to light and good water-resistance properties. They are distinguished especially by high colour brilliance and high tinctorial strength. The printing inks used in accordance with the invention are storage stable and do not exhibit any agglomeration or precipitation over prolonged periods of storage.

The following Examples serve to illustrate the invention. Unless otherwise indicated, the temperatures are given in degrees Celsius, and the percentages relate to percentages by weight

EXAMPLE 1

(i) A clear solution is prepared by mixing together 50.0 g of Vinacryl® 4025 (Vinamul Ltd.)

47.5 g of water, deionised 1.0 g of tributyl phosphate 2.5 g of ammonia (25%).

(ii) 12.5 g of Maxilon® Blue TRL carbonate, Ciba Spezialitätenchemie (C.I. Basic Blue 145), are dissolved in 87.5 g of caprylic acid.

(iii) To prepare a printing ink, 40 g of the solution obtained according to (i) are mixed with 1.6 g of the solution obtained according to (ii) and 0.1 g of a preservative (Forafac® D 1110).

The ink obtained according to (iii) is printed onto kraft paper using a 12 μm coating machine, and the resulting prints are dried.

To test the water resistance, the dried print (2×4 cm) is inserted between two sheets of filter paper (5×10 cm) soaked with water, and the resulting sandwich is clamped between two glass plates. The arrangement is stored in humid surroundings for 24 hours. Only a very slight blue colouration of the sheet of paper brought into contact with the print is ascertained, and no migration of the dye into the sheet of paper is observed.

By proceeding in the preparation of the ink in the manner described above under (iii) but using, instead of 1.6 g of the solution obtained according to (ii), a corresponding amount of Maxilon® Blue TRL carbonate without caprylic acid and testing the water resistance of a print on kraft paper obtained in the manner indicated above using the afore-described arrangement under identical conditions, a very strong blue colouration and an appreciable migration of the blue dye into the paper brought into contact with the print are ascertained.

EXAMPLE 2

(i) 2.0 g of Maxilon® Yellow GRL carbinol base, Ciba Spezialitätenchemie (C.I. Basic Yellow 29), are dissolved in 2.0 g of oleic acid.

(ii) 4.0 g of the solution obtained according to (i) are mixed with 3.7 g of the clear solution obtained according to Example 1 (i).

(iii) a 10% pigment dispersion is prepared by mixing 28.6 g of Unisperse® Yellow BAW-PI containing C.I. Pigment Yellow 13, Ciba Spezialitätenchemie, 40.0 g of the clear solution obtained according to Example 1(i) and 11.4 g of deionised water.

EXAMPLE 2a (i) 2.0 g of C.I. Basic Yellow 92 are dissolved in 2.0 g of oleic acid.

(ii) 4.0 g of the solution obtained according to (i) are mixed with 3.7 g of the clear solution obtained according to Example 1(i).

(iii) a 10% pigment dispersion is prepared by mixing 28.6 g of Unisperse® Yellow BAW-PI containing C.I. Pigment Yellow 13, Ciba Spezialitätenchemie, 40.0 g of the clear solution obtained according to Example 1 (i) and 11.4 g of deionised water.

The inks 1 to 6 listed in the following Table 1 are obtained by mixing the components indicated in Table 1 in the amounts specified therein.

TABLE 1

| Ink No. | Pigment dispersion according to (iii), in [g] | Dye mixture according to (ii), in [g] | Clear solution according to Example 1 (i), in [g] | Deionised water in [g] |
|---|---|---|---|---|
| 1 | 10 | 0 | 24 | 15.9 |
| 2 | 15 | 0 | 24 | 10.9 |
| 3 | 25 | 0 | 20 | 4.9 |
| 4 | 30 | 0 | 18 | 1.9 |
| 5 | 10 | 12.5 | 12.8 | 14.6 |
| 6 | 15 | 12.5 | 12.8 | 9.65 |

Inks 1 to 6 according to Table 1 are printed onto APCOII/II paper using a 12 μm coating machine and the prints obtained are dried.

The dried prints obtained using inks 1 to 6 are evaluated spectrophotometrically. The colour values in the L*C*h colour system and the depths of shade of the prints are indicated in Table 2. The values quoted are for the standard light type $D_{65}$ and for the 100 standard observer (CIE 1964). Gloss is excluded. The content of colourant present in each ink is indicated in the second column of the Table. The printing inks 5 and 6 used in accordance with the invention comprise a dye/oleate salt in addition to the pigment

TABLE 2

| Ink No. | Content of colourant | L* | C* | h | Depth of shade |
|---|---|---|---|---|---|
| 1 | 2% by weight of pigment | 87.3 | 117.2 | 88.8 | 3.03 |
| 2 | 3% by weight of pigment | 86.9 | 118.6 | 88 | 3.21 |
| 3 | 5% by weight of pigment | 85.8 | 117.2 | 86.1 | 2.73 |
| 4 | 6% by weight of pigment | 85.4 | 116.8 | 85.5 | 2.64 |
| 5 | 2% by weight of pigment + 0.5% by weight of dye/oleate | 86 | 122.1 | 86.7 | 4.64 |
| 6 | 3% by weight of pigment + 0.5% by weight of dye/oleate | 85.5 | 121.6 | 85.8 | 4.19 |

The Table shows that the prints obtained in accordance with the invention exhibit an appreciably increased depth of shade and a higher chroma C* compared with the prints produced using inks that comprise only a pigment as colourant.

EXAMPLE 3

(i) 2.4 g of Maxilon® Red GRL/oleate salt (prepared by dissolving Maxilon® Red GRL, Ciba Spezialitätenchemie (C.I. Basic Red 46) in oleic acid) are mixed with 7.6 g of the clear solution obtained according to Example 1 (i).

(ii) 2.0 g of the mixture obtained according to (i) are mixed with 7.14 g of Unisperse® Rubine 4BA-PA containing C.I. Pigment Red 57, Ciba Spezialitätenchemie.

(iii) To prepare a printing ink, the mixture obtained according to (ii) is diluted with 30.0 g of the clear solution obtained according to Example 1 (i), and then made up to 50.0 g with deionised water.

The ink obtained according to (iii) is printed onto kraft paper using a 12 μm coating machine and the resulting print is dried.

A print obtained in a corresponding manner using an ink containing no dye/oleate salt has a lower depth of shade, as can be seen from the following Table 3 with reference to the spectrophotometrically determined depths of shade. The print obtained in accordance with the invention was obtained using ink 1 and the comparison print was obtained using ink 2.

TABLE 3

| Ink No. | Content of colourant | C* | H | Depth of shade |
|---|---|---|---|---|
| 1 | 3% by weight of pigment + 0.5% by weight of dye/oleate | 68.3 | 27.8 | 1.9 |
| 2 | 5% by weight of pigment | 68.4 | 27.0 | 1.6 |

What is claimed is:

1. A process for printing a flat substrate, wherein the said substrate is printed with an ink composition comprising
    a) a basic dye together with
    b) an aliphatic carboxylic acid having 4-24 carbon atoms,
    d) a binder resin,
    and water.

2. A process according to claim 1, wherein the ink composition comprises as a further component
    c) a pigment.

3. A process according to claim 1, wherein the ink composition comprises as component b) a $C_8$-$C_{24}$carboxylic acid.

4. A process according to claim 1, wherein the amount of basic dye a) present in the ink composition is from 0.01 to 25% by weight based on the total weight of the printing ink.

5. A process according to claim 1, wherein the amount of basic dye a) present in the ink composition is from 0.1 to 5% by weight based on the total weight of the printing ink.

6. A process according to claim 1, wherein the amount of aliphatic carboxylic acid b) present in the ink composition is from 0.01 to 25% by weight, based on the total weight of the printing ink.

7. A process according claim 1, wherein the amount of aliphatic carboxylic acid b) present in the ink composition is from 0.1 to 5% by weight based on the total weight of the printing ink.

8. A process according to claim 2, wherein the amount of pigment c) present in the ink composition is from 0.1 to 35% by weight, based on the total weight of the printing ink.

9. A process according to claim 2, wherein the amount of pigment c) present in the ink composition is from 1 to 10% by weight based on the total weight of the printing ink.

10. A process according to claim 1, wherein the amount of binder resin d) present in the ink composition is from 0.1 to 40% by weight, based on the total weight of the printing ink.

11. A process according to claim 1, wherein the amount of binder resin d) present in the ink composition is from 1 to 10% by weight based on the total weight of the printing ink.

12. A process according to claim 1, wherein the flat substrate to be printed is paper.

13. A process according to claim 12, wherein paper is printed with an ink composition comprising
    a) a basic dye,
    b) a $C_{12}$-$C_{24}$carboxylic acid,
    and water.

14. A process according to claim 1, wherein the ink composition comprises
    a) from 0.01 to 25% by weight of a basic dye, based on the total weight of the ink
    b) from 0.01 to 25% by weight of a $C_4$-$C_{24}$carboxylic acid, based on the total weight of the ink
    and water.

15. A process according to claim 14, wherein the ink composition comprises
    a) from 0.1 to 5% by weight of a basic dye, based on the total weight of the ink
    b) from 0.1 to 5% by weight of a $C_4$-$C_{24}$carboxylic acid, based on the total weight of the ink
    and water.

16. A process according to claim 2, wherein the ink composition comprises
    a) from 0.01 to 25% by weight of a basic dye, based on the total weight of the ink
    b) from 0.01 to 25% by weight of a $C_4$-$C_{24}$carboxylic acid, based on the total weight of the ink
    c) from 0.1 to 35% by weight of a pigment, based on the total weight of the printing ink
    and water.

17. A process according to claim 16, wherein the ink composition comprises
    a) from 0.1 to 5% by weight of a basic dye, based on the total weight of the ink
    b) from 0.1 to 5% by weight of a $C_4$-$C_{24}$carboxylic acid, based on the total weight of the ink
    c) from 0.1 to 10% by weight of a pigment, based on the total weight of the printing ink
    and water.

18. A process according to claim 1, wherein the ink composition comprises
    a) from 0.01 to 25% by weight of a basic dye, based on the total weight of the ink
    b) from 0.01 to 25% by weight of a $C_4$-$C_{24}$carboxylic acid, based on the total weight of the ink
    d) from 0.1 to 40% by weight of a binder resin, based on the total weight of the printing ink
    and water.

19. A process according to claim 18, wherein the ink composition comprises
    a) from 0.1 to 5% by weight of a basic dye, based on the total weight of the ink
    b) from 0.1 to 5% by weight of a $C_4$-$C_{24}$carboxylic acid, based on the total weight of the ink d) from 1 to 10% by weight of a binder resin, based on the total weight of the printing ink and water.

20. A process according to claim 1, wherein the binder resin d) is a carboxylic acid group-containing polymer, obtained by polymerisation or copolymerisation of suitable vinyl monomers selected from the group consisting of acrylic acid, methacrylic acid, itaconic acid, crotonic acid, isocrotonic acid, 2-hydroxyethyl methacrylate, 2-hydyroxyethyl acrylate, methyl acrylate, methyl methacrylate, ethyl acrylate, ethyl methacrylate, butyl acrylate, butyl methacrylate, acrylonitrile, methacrylonitrile, acrylamide, methacrylamide, N,N-dimethylacrylamide, N, N-dimethylmethacrylamide, styrene, butadiene, vinyl acetate, N-vinylpyrrolidone, N-vinyl-N-methyl-formamide, N-vinyl-N-methyl-acetamide, N-vinyl-N-ethyl-acetamide, vinyl propionate, maleic anhydride and maleic acid.

21. A process according to claim 1, wherein the binder resin d) is a copolymer selected from the group consisting of styrene/acrylic acid copolymer, styrene/methacrylic acid copolymer, styrene/acrylic acid/methacrylate copolymer.

* * * * *